United States Defensive Publication [19] (H) [11] T966,005

Gillette [43] Jan. 3, 1978

[54] REPERTORY DIALER

[75] Inventor: Dean Gillette, Rumson, N.J.

[73] Assignee: Bell Telephone Laboratories Incorporated, Murray Hill and Berkeley Heights, N.J.

[21] Appl. No.: 812,770

[22] Filed: July 5, 1977

[51] Int. Cl.[2] ..... H04M 1/51

[52] U.S. Cl. ..... 179/90 B

[57] ABSTRACT

A repertory dialer is disclosed that includes a solid state display and a telephone keyboard coupled to a solid state memory. The solid state display comprises a plurality of alphanumeric characters, the first of which is used to provide an alphabetical index. The rest of the characters are divided into a name display and a telephone number display. The telephone keyboard is used to generate alphabetic and numeric inputs to the memory. A five-button scanning control causes the alphanumeric information stored in the memory to be sequentially displayed. Scanning is achieved by the operation of either a fast forward button, a slow forward button, a stop button, a slow backward button, or a fast backward button. Record and call function select buttons are used to select either the record or call modes of operation.

1 Claim, 1 Sheet Drawing,

6 Pages Specification

The file of this unexamined application may be inspected and copies thereof may be purchased (849 O.G. 1221, Apr. 9, 1968).

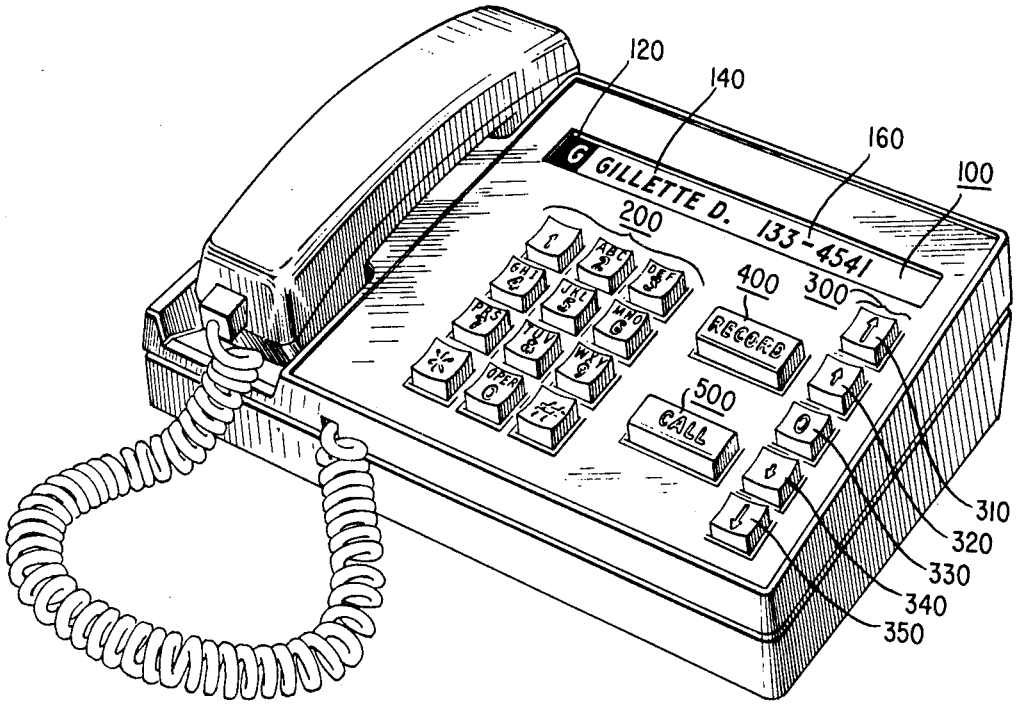

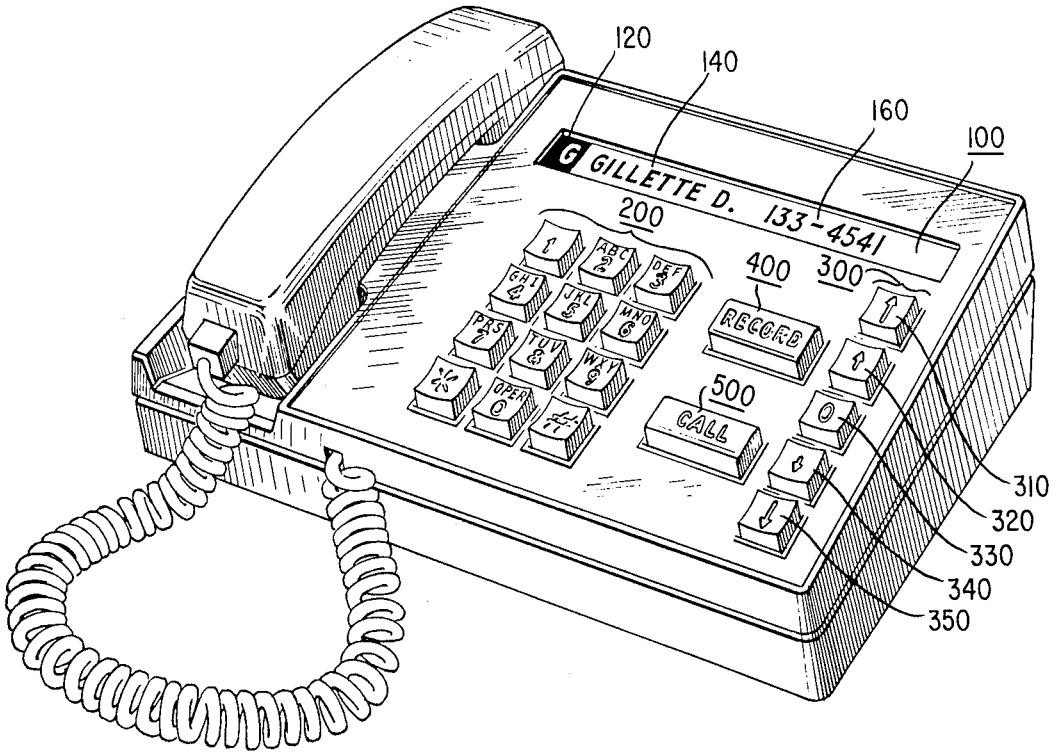
120
140
160
100
GILLETTE D. 133-4541
200
400
300
RECORD
500
CALL
310
320
330
340
350